A. P. WRIGHT.
TRACTION BALING MACHINE.
APPLICATION FILED NOV. 6, 1915.
1,227,355.
Patented May 22, 1917.
3 SHEETS—SHEET 3.
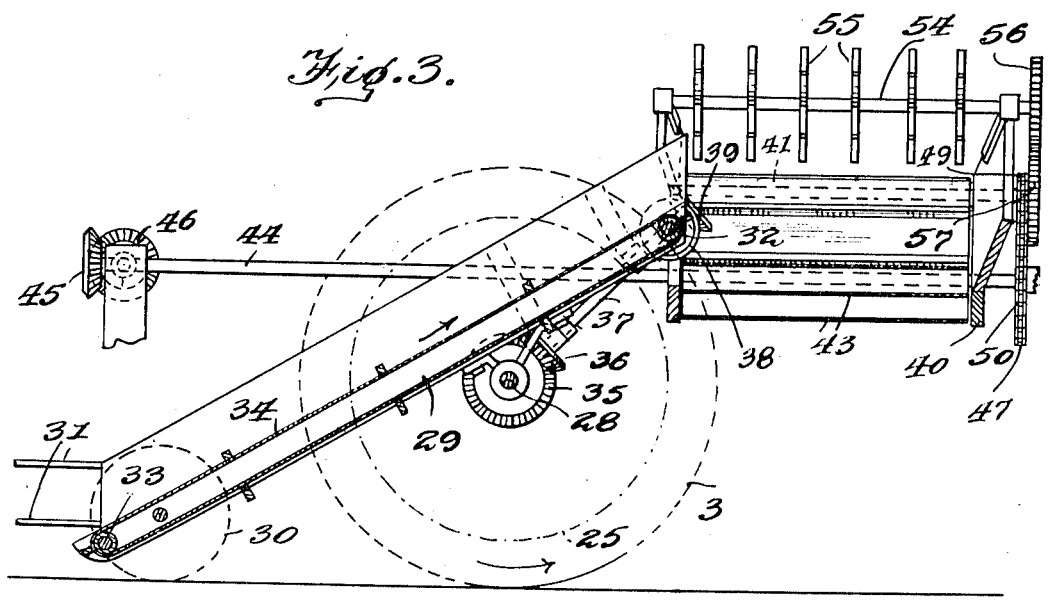
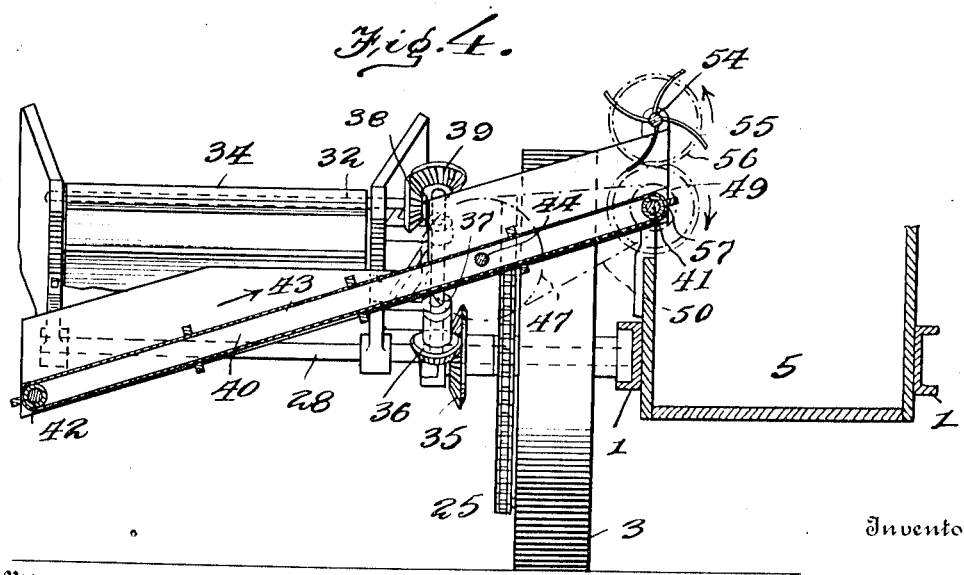

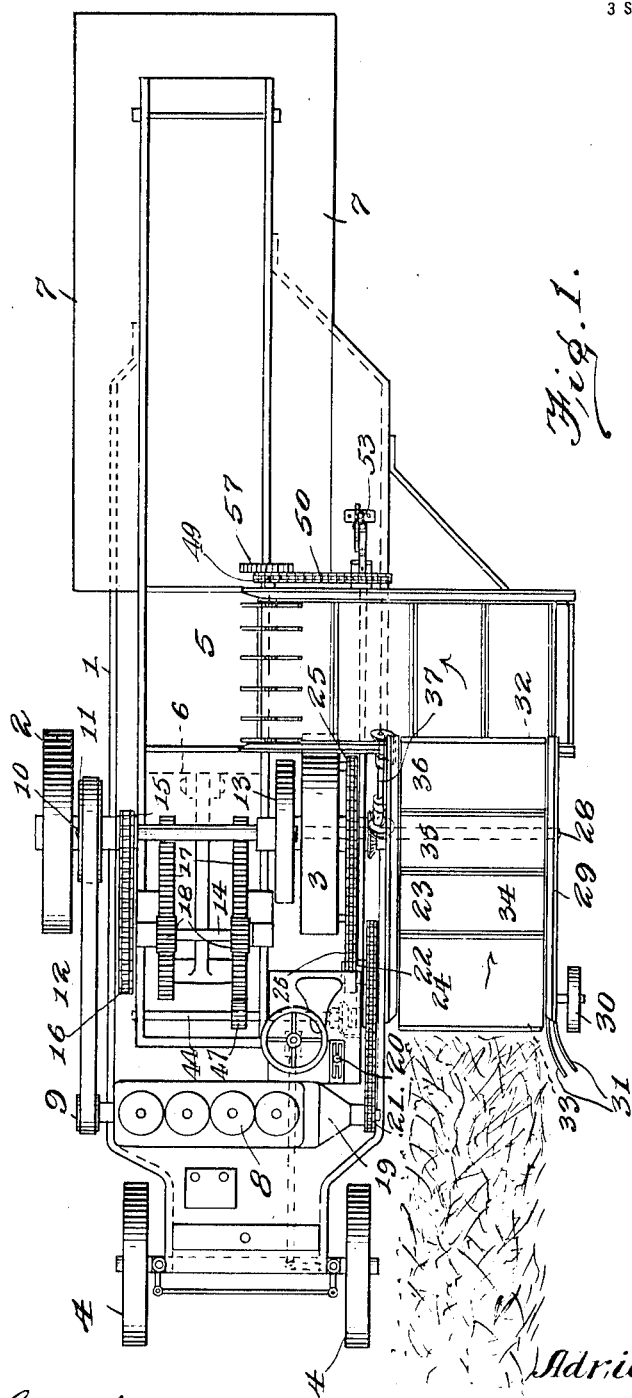

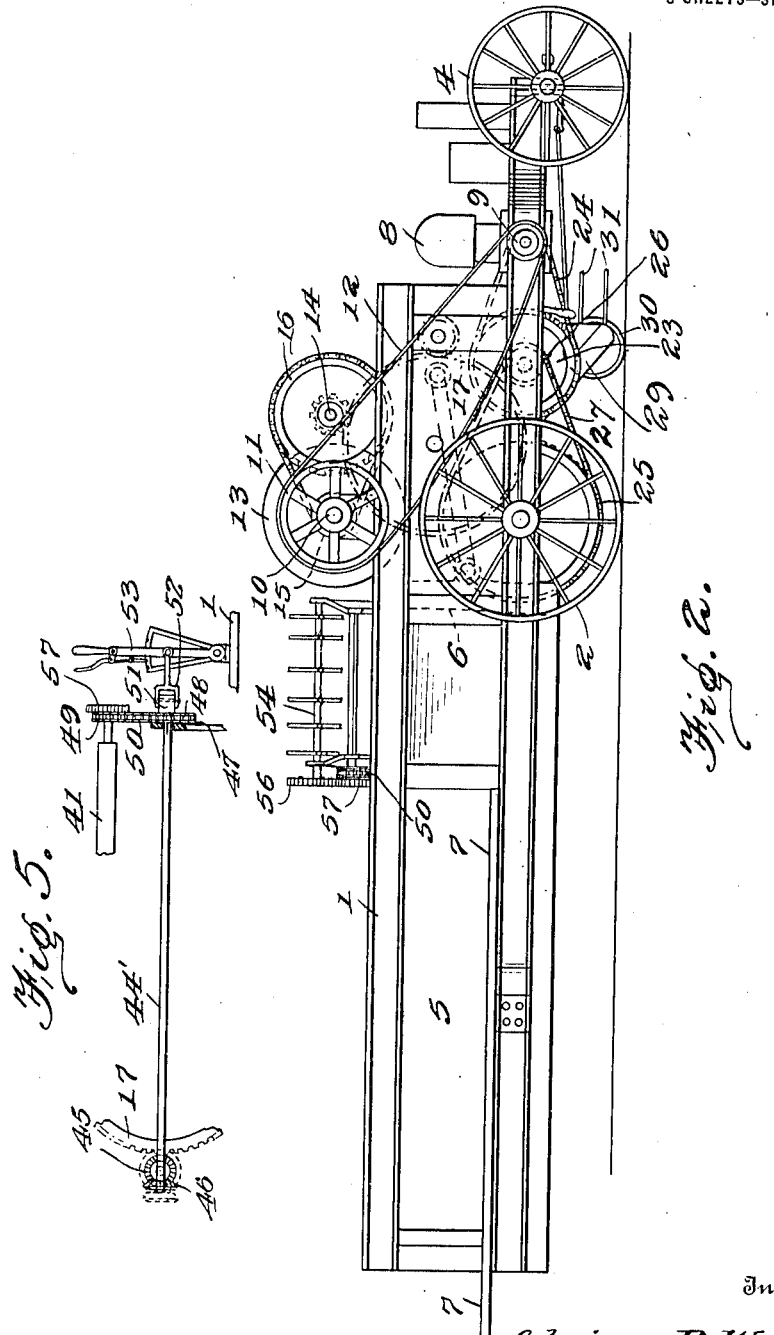

UNITED STATES PATENT OFFICE.

ADRIAN P. WRIGHT, OF VALLEY CENTER, KANSAS.

TRACTION BALING-MACHINE.

1,227,355.  Specification of Letters Patent.  Patented May 22, 1917.

Application filed November 6, 1915. Serial No. 60,032.

*To all whom it may concern:*

Be it known that I, ADRIAN P. WRIGHT, a citizen of the United States, residing at Valley Center, in the county of Sedgwick and State of Kansas, have invented new and useful Improvements in Traction Baling-Machines, of which the following is a specification.

This invention relates to traction baling machines and it consists in the novel features hereinafter described and claimed.

An object of the invention is to provide a self-propelled traction machine having a baling press mounted thereon with means for operating the press from the engine which propels the machine. The parts of the machine are so arranged that it may pass along a windrow of hay and gather the same and elevate the hay and deposit it in the baling press where it is formed into bales and when a suitable number of bales have been formed they may be ejected from the machine and deposited upon the ground in groups.

In the accompanying drawings:—

Figure 1 is a top plan view of the machine.

Fig. 2 is a side elevation of the same.

Fig. 3 is a longitudinal sectional view thereof.

Fig. 4 is a transverse sectional view thereof.

Fig. 5 is a side elevation of parts thereof.

The machine comprises a frame 1 preferably of metal such as channel iron, angle iron and the like. The rear portion of the frame 1 is supported at one side upon ground wheel 2 and at its opposite side upon a traction wheel 3. Dirigible wheels 4 support the forward portion of the frame 1 and any suitable means may be provided for steering the said wheels 4. A baling press 5 of conventional form is mounted upon the frame 1 and the said press is provided with a reciprocating plunger 6. A platform 7 is mounted at the rear portion of the frame 1 and about the delivery end of the press 5 and the operator who attends to the wiring of the bales may stand upon the said platform 7. An engine 8, preferably of the hydrocarbon type, is mounted upon the forward portion of the frame 1 and its shaft is provided at one end with a belt pulley 9. A shaft 10 is journaled upon the frame 1 above the forward end of the press 5 and is provided at one end with a belt pulley 11. A belt 12 is trained around the pulleys 9 and 11 and is adapted to transmit rotary movement from the shaft of the engine 8 to the shaft 10. A fly wheel 13 is carried by the shaft 10 in any suitable or usual manner. A shaft 14 is journaled upon the frame 1 in advance of the shaft 10. A sprocket wheel 16 is mounted on the shaft 14 and a sprocket wheel 15 is mounted on the shaft 10. A chain 15' is trained around the wheels 15 and 16. Gear wheels 17 are journaled for rotation at the forward end of the press 5 and the plunger 6 is operatively connected with the sides of the gear wheels 17 at points eccentric of the centers thereof. Gear wheels 18 are mounted upon the shaft 14 and mesh with the gear wheels 17. Therefore it will be seen that as the shaft 10 rotates rotary movement is transmitted to the shaft 14 which in turn through the gear wheels 18 rotates the gear wheels 17 and the plunger 6 is reciprocated back and forth in the press 5.

A change speed device 19 is operatively connected with the shaft of the engine 8. The said device may be of any usual pattern and a lever 20 is provided for operating the same in the usual manner. A sprocket wheel 21 is mounted upon the shaft of the change speed device 19 and a stub shaft 22 is journaled upon the frame 1. A sprocket wheel 23 is mounted upon the stub shaft 22 and a sprocket chain 24 is trained around the sprocket wheels 21 and 23 and is adapted to transmit rotary movement from the change speed device 19 to the stub shaft 22. A sprocket wheel 25 is fixed to the side of the traction wheel 3 and another sprocket wheel 26 is fixed to the stub shaft 22. A sprocket chain 27 is trained around the sprocket wheels 25 and 26 and is adapted to transmit rotary movement from the stub shaft 22 to the traction wheel 3 whereby the machine is propelled over the surface of the ground.

An arm 28 is mounted at one side of the frame 1 and an elevator casing 29 is pivotally mounted at a point between its ends upon the said arm. The casing 29 is forwardly and downwardly inclined and carries at its lower end a gage wheel 30 adapted to travel upon the surface of the ground as the machine moves over the same. The casing 29 is provided at its lower forward end with forwardly disposed fenders or fingers 31. A roller 32 is journaled at the upper rear end of the casing 29 and a roller 33 is journaled at the lower forward end thereof A slatted belt 34 is trained around the rollers 32 and 33 and is adapted to move along the casing 29.

A beveled gear wheel 35 is mounted upon the end of the stub shaft 22 hereinbefore described and meshes with a bevel gear wheel 36 positioned above the same. A shaft 37 is slidably mounted in the beveled gear wheel 36 but the said gear wheel is constrained to rotate in unison with the said shaft or conversely the said shaft rotates with the gear wheel 36. A beveled gear wheel 38 is fixed to the shaft of the roller 33 and meshes with a similar wheel 39 mounted at the upper end of the shaft 37. Therefore it will be seen that as the stub shaft 22 is rotated rotary movement is transmitted through the intermeshing gear wheels 35 and 36 to the shaft 37 which in turn through the intermeshing gear wheels 39 and 38 rotate the roller 33. Therefore the belt 34 is caused to move longitudinally along the casing 29. Inasmuch as the casing 29 is pivotally supported at a point between its ends upon the arm 28, the forward end of the said casing 29 may rise and fall as the forward supporting wheel 30 thereof travels over uneven places at the surface of the ground.

An inclined casing 40 is mounted at the side of the intermediate portion of the frame 1 and the delivery end of the conveyer belt 34 in the casing 29 is disposed above the upper portion of the casing 40. A roller 41 is journaled for rotation at the upper inner end of the casing 40 and a roller 42 is journaled for rotation at the lower outer end thereof. A slatted belt 43 is trained around the rollers 41 and 42. A shaft 44 is journaled for rotation upon the frame 1 and is provided at one end with a beveled gear wheel 45 adapted to be engaged by similar wheel 46 mounted upon a shaft 44' to be described. A gear wheel 47 is mounted upon the shaft 44 and meshes with one of the wheels 17 as best shown in Fig. 1.

A clutch member 51 is slidably mounted upon the shaft 44' and is constrained to rotate in unison therewith. The said clutch member 51 is engageable with the clutch hub 48 of the sprocket wheel 47 whereby when the said clutch member is in engagement with the hub of the said wheel, the wheel 47 rotates in unison with the shaft 44'. Through the sprocket chain 50 and the sprocket wheel 49 rotary movement is transmitted from the shaft 44' to the upper roller 41 in the casing 40. A claw member 52 is connected with the clutch member 51 and also connected with a lever 53 which in turn is fulcrumed upon the frame 1 at a point within convenient reach of one standing upon the platform 7. When the shaft 41 is rotating, the belt 43 moves longitudinally of the casing 40 and the material which is received from the belt 34 is moved along the casing 40 and deposited in the press 5 and is operated upon by the plunger 6 therein. A shaft 54 is journaled at the inner upper end of the casing 40 and is provided with a number of fingers 55. A gear wheel 56 is mounted upon the shaft 54 and intermeshes with a gear wheel 57 fixed to the shaft of the roller 41. Therefore it will be seen that as the roller 41 rotates and moves the belt 43 as hereinbefore described, the shaft 54 is rotated whereby the fingers 55 carried by the said shaft engage the material which is elevated by the belt 43 and kicks or throws the same into the receiving opening of the press 5.

From the foregoing description taken in conjunction with the accompanying drawings it will be seen that a traction baling machine is provided and the parts thereof are so arranged that the hay will be gathered while it is in a windrow or line and is elevated first by the belt 34 and deposited upon the belt 43 which in turn delivers the hay into the body of the baling press 5. Also the fingers 55 operating upon the hay as it is delivered into the press will scatter or distribute the same evenly in the receiving opening of the press whereby the plunger 6 may operate against the same and form a bale in the said press. The operator who stands upon the platform 7 may manipulate the lever 53 to interrupt the feeding of the hay to the press at desired times and the said operator is also in a position to apply the tie wires to the bales as they are completed. When a suitable number of bales have been collected at the rear end of the press 5, the means usually employed for retaining the said bales may be removed whereby one or more bales may be deposited upon the surface of the ground.

Having described the invention what is claimed is:—

1. A traction baling press comprising a wheel mounted frame, an engine mounted upon the frame for driving the wheels, a press mounted upon the frame, means for operating the press from the engine, a gathering and elevating means located at each side of the frame, means for operating the gathering and elevating means from the engine, conveying means located behind the gathering and elevating means adapted to deliver material to the press, means for operating the said conveying means from the engine, and ejector fingers mounted for movement above the said conveying means and operated from the said conveying means.

2. A traction baling machine comprising a wheel mounted frame, an engine mounted upon the frame and adapted to operate the wheels, a press mounted upon the frame, means for operating the press from the engine, a hay gathering and elevating means pivotally mounted at the side of the frame, a gage wheel attached to said elevating and gathering means and adapted to travel along the ground, means for operating the gathering and elevating means from the engine, a conveying means located behind the gathering and elevating means and adapted to receive the hay from the gathering and elevating means and deliver the same to the press, means for scattering the hay as it is delivered to the press, means for operating the conveying means from the engine, and means for interrupting the operation of the said conveying means while the other elements are operating.

3. A traction baling machine comprising a wheel mounted frame, an engine adapted to operate the wheels, a press mounted upon the frame, means for operating the press from the engine, a hay gathering and elevating means mounted at the side of the frame, means for operating the gathering and elevating means from the engine, a conveying means located behind the elevating and gathering means and adapted to deliver material to the press, means for operating said conveying means from the engine, a shaft journaled for rotation above the delivery end of the conveying means, means for rotating the shaft from the said conveying means, and outstanding fingers carried by the shaft and adapted to engage the material and throw the same into the press.

In testimony whereof I affix my signature in presence of two witnesses.

ADRIAN P. WRIGHT.

Witnesses:
   GEORGIA G. WRIGHT,
   P. D. GARDINER.